United States Patent
Takase et al.

(10) Patent No.: US 7,053,305 B2
(45) Date of Patent: May 30, 2006

(54) STRUCTURE FOR MOUNTING A DOOR WIRE HARNESS

(75) Inventors: Kouji Takase, Yokkaichi (JP); Yukio Yamamoto, Yokkaichi (JP); Hidenobu Ojima, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 11/033,742

(22) Filed: Jan. 13, 2005

(65) Prior Publication Data

US 2005/0150678 A1    Jul. 14, 2005

(30) Foreign Application Priority Data

Jan. 14, 2004    (JP)    ............................ 2004-006876
Jan. 14, 2004    (JP)    ............................ 2004-007097

(51) Int. Cl.
    *H02G 1/00*    (2006.01)
(52) U.S. Cl. ..................... 174/72 A; 174/135
(58) Field of Classification Search ............. 174/72 A, 174/72 R, 70 R, 135, 71 R
    See application file for complete search history.

(56) References Cited

U.S. PATENT DOCUMENTS

| 5,448,017 | A | | 9/1995 | Nakajima et al. |
| 5,981,877 | A | | 11/1999 | Sakata et al. |
| 6,051,790 | A | | 4/2000 | Takeuchi et al. |
| 6,100,471 | A | * | 8/2000 | Fouache ............... 174/72 C |
| 6,376,777 | B1 | | 4/2002 | Ito et al. |
| 6,536,835 | B1 | | 3/2003 | Murakami et al. |
| 2001/0006113 | A1 | * | 7/2001 | Mori .................. 174/72 A |
| 2002/0014789 | A1 | * | 2/2002 | Sora et al. ............... 296/208 |
| 2002/0111346 | A1 | | 8/2002 | Murakami et al. |

FOREIGN PATENT DOCUMENTS

| EP | 1108620 | 6/2001 |
| EP | 1236599 | 9/2002 |
| JP | 08-33166 | 2/1996 |
| JP | 09-240390 | 9/1997 |
| JP | 11-20573 | 1/1999 |
| JP | 11-321483 | 11/1999 |
| JP | 2002-27640 | 1/2002 |

OTHER PUBLICATIONS

English language Abstract of JP 2002-27640.
English language Abstract of JP 11-321483.
English language Abstract of JP 08-33166.
English language Abstract of JP 09-240390.
U.S. Appl. No. 11/012,268, filed Dec. 16, 2004.
English language Abstract of JP 11-20573.

* cited by examiner

*Primary Examiner*—Jinhee Lee
(74) *Attorney, Agent, or Firm*—Greenblum & Bernstein, P.L.C.

(57) ABSTRACT

The structure for mounting a door wire harness is configured to wire a door harness from a door inner panel toward a body panel in a vehicle. The door harness is mountable into a grommet. The door inner panel has a portion proximal to the body panel. The proximal portion is recessed and the recessed portion includes a grommet-holding device, such that the grommet can be fixed into the recessed portion from outside the door inner panel. Further, the door inner panel includes an inward face confronting the compartment of the vehicle. The portion proximal to the body panel includes a weather strip and the grommet is installed farther from the inward face than the weather strip.

11 Claims, 13 Drawing Sheets

STRUCTURE FOR MOUNTING A DOOR WIRE HARNESS

BACKGROUND OF THE INVENTION

1. Field of the Invention

The present invention relates to a structure for mounting a door wire harness and a method for installing that structure. In a system where a door wire harness (also referred to simply as a "door harness") is wired in a door panel of a vehicle and pulled toward its body panel, the edge face of the door panel facing the corresponding edge of the body panel is usually provided with a hole through which the wire harness is passed. The present invention concerns in particular a system by which the wire harness is wired from a door inner panel toward the body panel.

2. Description of Background Information

The door inner panel of a vehicle is arranged to be aligned with the body panel via its edge face. In accordance with standard practice, the door harness is extracted from inside the door inner panel through a hole provided in the edge face of the door inner panel, the door harness being connected to a wire harness in the body panel. The drawbacks of this practice are that operations of passing the door harness into the hole are carried out in the door inner panel, where the work cannot be controlled visually, and require a strong pulling force. A further drawback is that when a grommet (or duct) is mounted around the door harness, it is very difficult to engage it with the hole of the edge face.

For the above reasons, recent developments led to the use of a so-called "passwork-less grommet (or duct)", which eliminates harness-passing for mounting the door harness.

For instance, patent document JP-A-Hei 8-33166 discloses a passwork-less grommet 1 used in a structure for mounting a door harness, as shown in FIG. 1. Typically, this "passwork-less grommet 1" comprises a base portion 2 and a tubular portion 3 projecting therefrom. A door harness W is passed through this tubular portion 3. The base portion 2 comprises a pair of fitting portions 4 at its top and bottom ends when viewed in FIG. 1. The door inner panel D, into which "the passwork-less grommet 1" is mounted, has an edge face 5 that confronts a corresponding edge of the body panel when the door is closed. The edge face 5 comprises a slide channel 6. This slide channel 6 has confronting sidewalls (top and bottom sidewalls in FIG. 1), each of which is provided with a grooved portion 7 adapted to receive the corresponding fitting portions 4.

The door harness W is initially placed near the base portion 2 of the grommet 1, and inserted into the tubular portion 3. Then, the fitting portions 4 are inserted into the grooved portion 7, so that the passwork-less grommet 1 fits into the slide channels 6. Thereafter, a weather strip 8 is installed from above the passwork-less grommet 1.

In the above construction, the slide channels 6 and the grooved portions 7 are formed in the edge face of the door inner panel D by stamping. This poses problems in that stamping out such a complex configuration is a very difficult and costly task. Moreover, such a fitting structure cannot secure a good sealing. Likewise, for instance, a patent document JP-A-Hei 11-20573 discloses a "passwork-less" grommet 1 used in a structure for mounting a door harness, as shown in FIGS. 2A and 2B. Typically, this passwork-less grommet 1 comprises a cylindrical bellows portion 60, through which is passed the door harness W when it is pulled out from the door inner panel D. This grommet 1 also comprises a mounting panel 62 that is formed of a substantially flat sheet bent into an L shape. This mounting panel 62 is placed along the corner portion formed by respectively the inward face and edge face of the door inner panel D, where the door harness W can pass inside it. The door harness W is then protected by a protective cover 64 applied from the inward side (compartment side). Further, a weather strip 65 is mounted across the passwork-less grommet 1.

In the above construction, the door harness W is not pulled out from the hole provided in the door inner panel D as in the past. Instead, the door harness W can be wired from the inward face of the door inner panel D to its edge face along the corner portion, and extended toward the body panel B. Further, the direction of the door harness W is changed upwardly or downwardly, at the fulcrum position of the hinge between the door and the vehicle body. Accordingly, when the door is opened or closed, the door harness W is twisted, but not stretched or compressed.

However, the above structure requires the bellows portion 60, the mounting panel 62 and the protective cover 64 to install the door harness W in the door inner panel D. Such a design increases the number of component parts, and thus costs, and assembly work becomes complicated.

SUMMARY OF THE INVENTION

The present invention is provided to solve at least the above-mentioned problems, and provides a structure in which the grommet or duct equipped with the door harness can be fixed easily with the door inner panel, so that door harness installation costs are lowered and the installing operations are made easier.

To this end, there is provided a structure for wiring a door harness from a door inner panel toward a body panel in a vehicle, the door harness being mountable into a grommet. The door inner panel has a portion proximal to the body panel. The proximal portion is recessed and the recessed portion includes a grommet-holding device, such that the grommet can be fixed into the recessed portion from outside the door inner panel.

Preferably, the door inner panel includes an inward face confronting the compartment of the vehicle. The portion proximal to the body panel includes a weather strip and the grommet is installed farther from the inward face than the weather strip.

Typically, the door inner panel has an inward face confronting the compartment of a vehicle, an edge face confronting a body panel, and a corner zone formed between the inward face and the edge face; the recessed portion is formed in the corner zone and includes a portion at the edge face with a periphery and a portion at the inward face, and the grommet-holding device is provided in the portion at the edge face; the grommet includes a substantially flat portion having first and second faces, a side face and at least one bore portion; the grommet further includes a first tubular portion proximal to the body panel and at least one second tubular portion distal from the body panel, the first and second tubular portions projecting from the first face of the substantially flat portion and communicating through the at least one bore portion; whereby the grommet is fixed to the door inner panel by the grommet-holding device.

Preferably, the grommet-holding device includes a shouldered section formed in the periphery and the shouldered section is fitted with a linking frame including ribbed or grooved guides. The grommet includes a housing having a substantially flat rectangular shape which has the first and second faces, longitudinal side faces provided with respective grooved or ribbed guides, whereby the grommet is fitted to the recessed portion in a folded condition, such that the grooved or ribbed guides of the grommet fit with the ribbed or grooved guides of the linking frame and the second tubular portion projects along the inward face.

Preferably still, the linking frame has substantially U-shaped configuration with two arm portions, and the arm portions extend from the shouldered section of the recessed portion beyond the inward face, thereby forming a projecting guide and, when the grommet includes grooved guides, the ribbed guides of the arm portions fit therewith.

Preferably yet, the first tubular portion includes a bellows section and an end portion with a stopper, which engages with a hole in the body panel, and the at least one second tubular portion includes at least one dividing wall so as to form a plurality of longitudinal compartments, whereby the electrical cables in the door harness can be divided into the longitudinal compartment.

Further, the at least one second tubular portion may include a plurality of second tubular portions, whereby the electrical cables in the door harness can be divided into the longitudinal compartment.

In the above structure, the grommet may include a clip and the portion at the inward face of said recessed portion may include a clip hole for hooking said clip.

Suitably, the linking frame is made of a metal.

Alternatively, the grommet-holding device includes a substantially round hole with a periphery formed in the portion at the edge face, and the substantially flat portion of the grommet includes a disk-like portion with a side face. The disk-like portion includes first and second bore portions that cross from the first face to the second face, wherein the side face includes a side groove adapted to engage with the periphery of the substantially round hole, whereby the door harness can be passed through the second tubular portion and second bore portion, then turned into the first bore portion and first tubular portion.

Alternatively still, the grommet-holding device includes a substantially round hole with a periphery formed in the portion at the edge face, and a substantially flat portion of the grommet includes a disk-like portion with a side face and the disk-like portion includes a bore portion that communicates with the first and second tubular portions inside the disk-like portion, wherein the side face includes a side groove adapted to engage with the periphery of the substantially round hole, whereby the door harness can be passed through the second tubular portion, the bore portion and the first tubular portion.

Preferably, the side groove of said disk-like portion forms an annular seal lip adjacent the first face adapted to be tightly attached to the portion at the edge face of the recessed portion of the door inner panel, a weather strip passing on the first face of the disk-like portion between the first and second tubular portions.

Typically, the body panel includes a hole and the first tubular portion has an exit end provided with a stopper, wherein the stopper is engageable with said hole, whereby the door harness is wired through the recessed portion and pulled out from the first tubular portion of the grommet and the door harness is wired to the body panel.

In the above structure, the grommet is preferably made of rubber or an elastomer.

The invention also relates to a door harness wiring system including a structure for mounting a door harness from a door inner panel toward a body panel in a vehicle. The door inner panel has a portion proximal to the body panel, and the door harness is mountable into a grommet. The proximal portion is recessed and the recessed portion includes grommet-holding device, whereby the grommet can be fixed into the recessed portion from outside the door inner panel.

The invention further relates to a method for mounting a door harness from a door inner panel toward a body panel in a vehicle, the method including providing a recessed portion in a portion of the door inner panel proximal to the body panel; providing a grommet-holding device in the recessed portion; providing a grommet into which the door harness is mountable; and affixing the grommet in the recessed portion from outside the door inner panel.

In the above structure, a door harness fitting recess is provided in the door inner panel, and the grommet is placed and fixed at a given position of a detachable panel. The detachable panel is then engaged with the fitting recess (recessed area) in the door inner panel. In this manner, the grommet is easily affixed to the door inner panel. The door harness can be thus easily wired from the door inner panel to the body panel.

Likewise, as the structure only requires combining the fitting recess of the door inner panel with the detachable panel, there is no need for a stamping step to form a complex configuration. The number of assembling steps is thus reduced, and manufacturing costs of the structure are likewise reduced.

In a preferred embodiment of the above structure, in order to mount the grommet or duct in the door inner panel, the linking frame is provided with ribbed guides, for instance, which simply fit into the grooved guides of the grommet, and the grommet is then slid along the ribbed guides.

Moreover, since the ribbed guides and the grooved guides are hermetic, they secure a good sealing capacity around the grommet.

Further, in a preferred embodiment, the tubular portion is rendered more resistant to deformation by the provision of a dividing wall. The tubular portion can then be made flat, and the door harness can be wired even in small spaces, such as in the door inner panel, or between the detachable panel and the trim. Alternatively, when a plurality of tubular portions are provided and the door harness is divided into a corresponding number of portions, each tubular portion can also be made smaller and/or flat.

Further, wiring the door harness from the door inner panel to the body panel simply requires to slide fit the grommet (including the door harness) into the linking frame that is fixed to the door inner panel.

According to the embodiment mentioned above, the linking frame is fixed into the door-harness fitting recess in the door inner panel, and the grommet/duct is fitted to the linking frame and fixed thereto. The grommet/duct can thus be easily affixed to the door inner panel, whereby the door harness is wired from the door inner panel to the body panel.

Further, the position of the door inner panel where the grommet is mounted is simply constituted by the fitting recess, and the linking frame is fixed thereto. It is thus no longer necessary to stamp out a complicated door inner panel structure. The number of working steps and manufacturing costs of the structure are thus reduced.

In a second embodiment, the grooved guides of the grommet/duct (including the door harness) are fitted, from outside, to the periphery of the substantially round hole provided in the edge face of the door inner panel. Thus, it is no longer necessary to pass the grommet into the through-hole from inside the door inner panel, which was burdensome for workers in the past. Further, the above fitting device secure a good sealability between the grommet and the door inner panel, and require no other device for fixing them, such as bolting. As the grommet/duct is integrally formed, the number of component parts is reduced and the manufacturing costs of the grommet can be lowered.

In the above structure, the first tubular portion is provided farther to the exterior of the vehicle compartment than the weather strip. Nonetheless, good sealing can be secured, because the side groove of the grommet fits tightly with the periphery of the round hole, and the edge face of the door inner panel is adhered by the seal lip projecting from the disk-like portion.

Likewise, although the door harness is wired toward the body panel from outside the weather strip, water sealing is secured. Furthermore, in the above construction, the door harness can be wired at the position at the fulcrum line of the hinge between the door and the car body. It is therefore unnecessary to provide stretching and/or compressing capability to the door harness for adapting to the opening or closing of the door, and the configuration of the structure can be simplified.

As can be understood from above, the grooved guides of the grommet/duct are simply fitted from outside to the periphery of the substantially round hole formed in the edge face of the door inner panel. The work operations of the past, i.e., passing the door harness into the through-hole from inside the door inner panel, can thus be obviated, and operations of pulling out the door harness toward the body panel are greatly facilitated.

Furthermore, it is sufficient to fit the integrally-formed grommet/duct into the through-hole of the door inner panel from outside. Accordingly, the number of component parts is reduced, and the manufacturing costs of the door-harness mounting structure can be lowered.

BRIEF DESCRIPTION OF THE DRAWINGS

The above, and the other objects, features and advantages of the present invention will be made apparent from the following description of the preferred embodiments, given purely as examples, with reference to the accompanying drawings, in which.

DETAILED DESCRIPTION OF THE INVENTION

Figure 1:
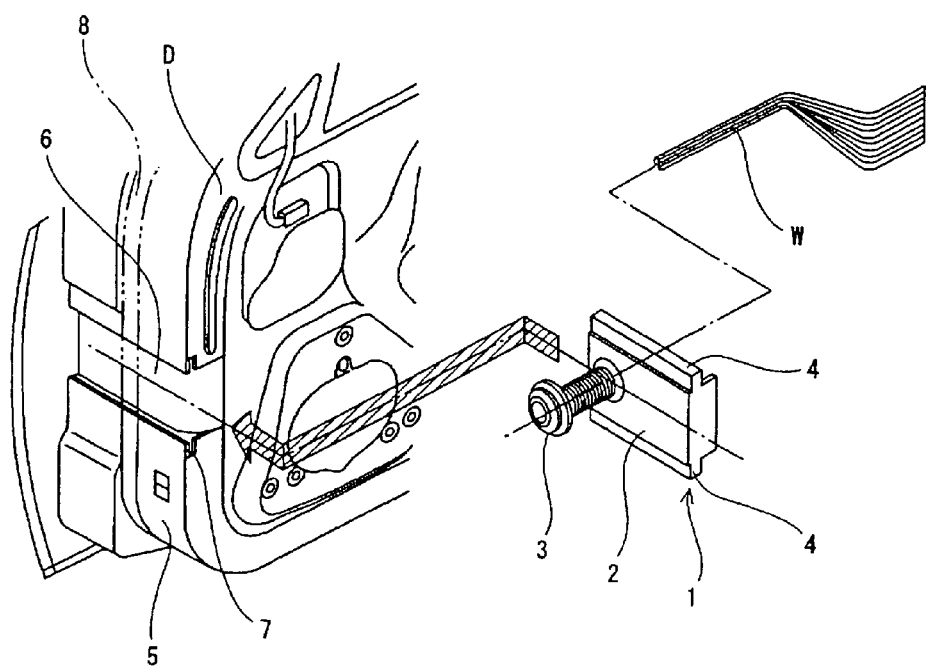
FIG. 1 is a perspective view of an example of a prior art structure for mounting a door harness.
Figure 2A:
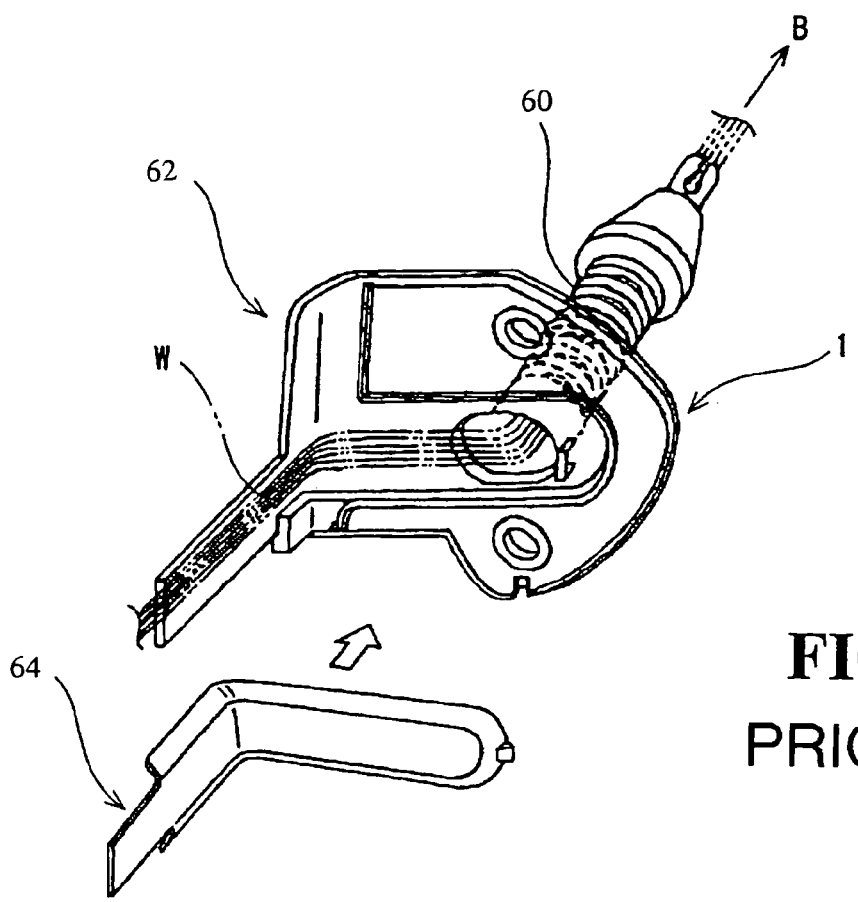
FIG. 2A is a perspective view of another example of a prior art structure for mounting a door harness, seen from the internal side of the door inner panel before a protective cover is mounted.
Figure 2B:
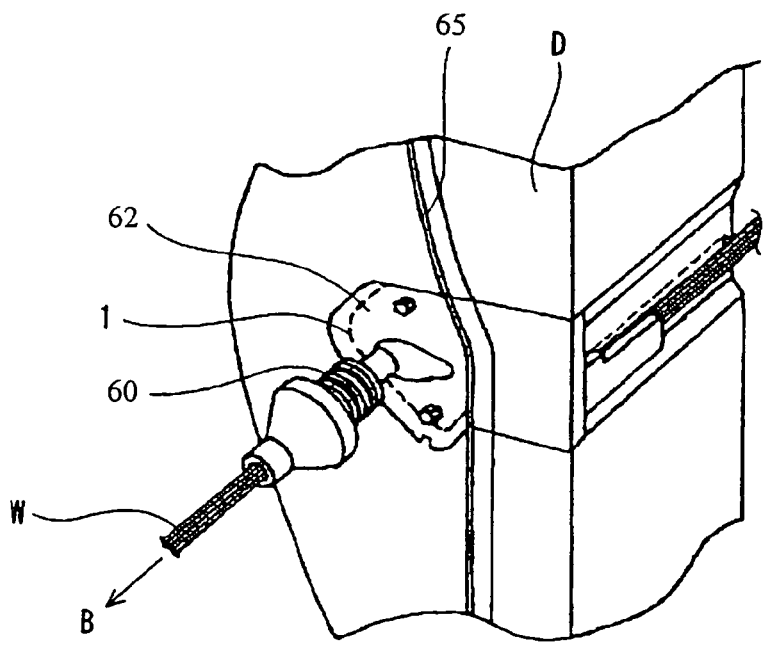
FIG. 2B is a perspective view of the structure of FIG. 2A seen from the other side, after the protective cover is mounted.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

In the following description, the word "grommet" includes not only the grommets in a classical sense, but also those including auxiliary component parts not limited to protecting the wire harness. Moreover, the grommet here generally takes the form of a duct or tube for housing wires of a wire harness, for instance as shown in the figures, the terms "grommet", "duct", "tube", or the like being considered in the present specification as interchangeable for designating that part, as shall be understood by the person skilled in the art of wire harness installation.

FIGS. 3 to 8 show a structure 10 for mounting a door harness W according to a first embodiment of the invention. In this structure, the door inner panel 11 includes an inward face 11a confronting the vehicle's compartment, and an edge face 11b confronting the corresponding edge face of a vehicle body panel 16 when the door is closed. A weather strip 18 extends along a longitudinal line on the edge face 11b, and a door harness W is wired toward the body panel 16, e.g., via a position farther away from the inward face than the weather strip 18, whereby the weather strip is innermost compared to the wiring position.

Figure 4A:
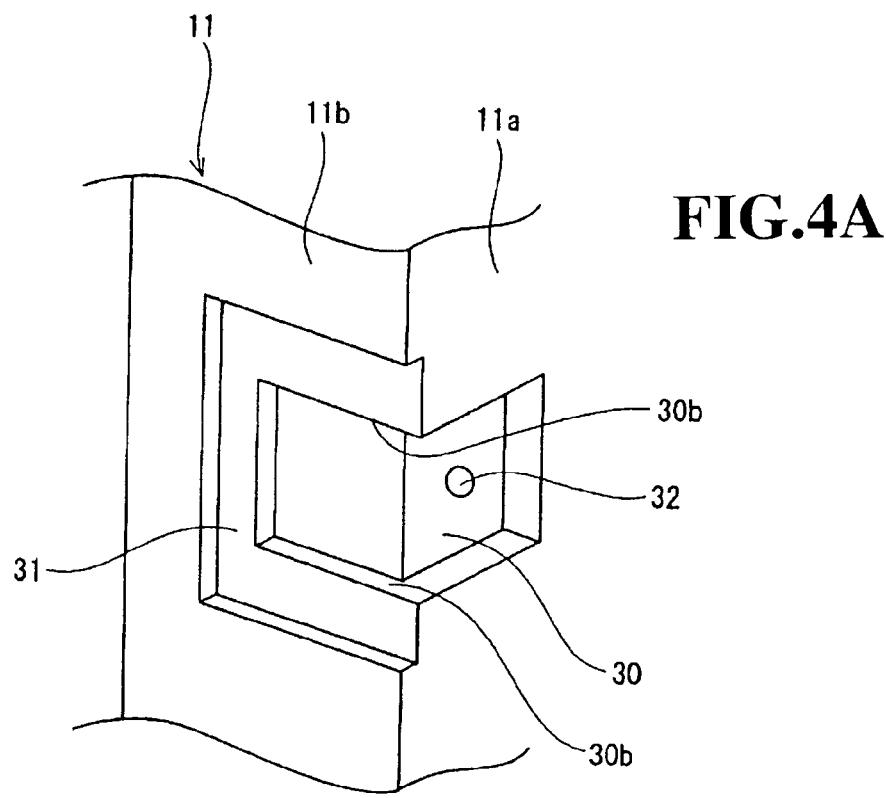
FIG. 4A is a perspective view of the corner portion of the door inner panel where the grommet/duct is mounted in the embodiment of FIG. 3.
Figure 4B:
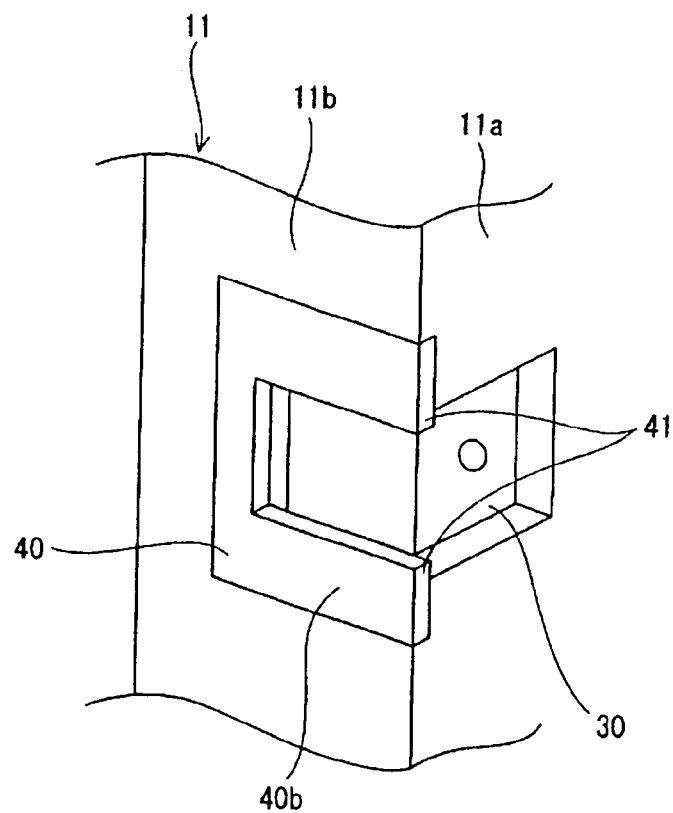
FIG. 4B is a perspective view of the same corner portion as in FIG. 3A, when a linking frame is fitted thereto.

As shown in FIGS. 4A and 4B, the door inner panel 11 is provided with a recessed portion 30 for engaging the door harness, formed at the corner of the inward face 11a and the edge face 11b. The outer periphery of the recessed portion 30 at the door panel's edge face 11b has a shouldered section 31 for receiving a linking frame. The depth of this shouldered section 31 is less than that of the recessed portion 30 overall.

Figure 3:
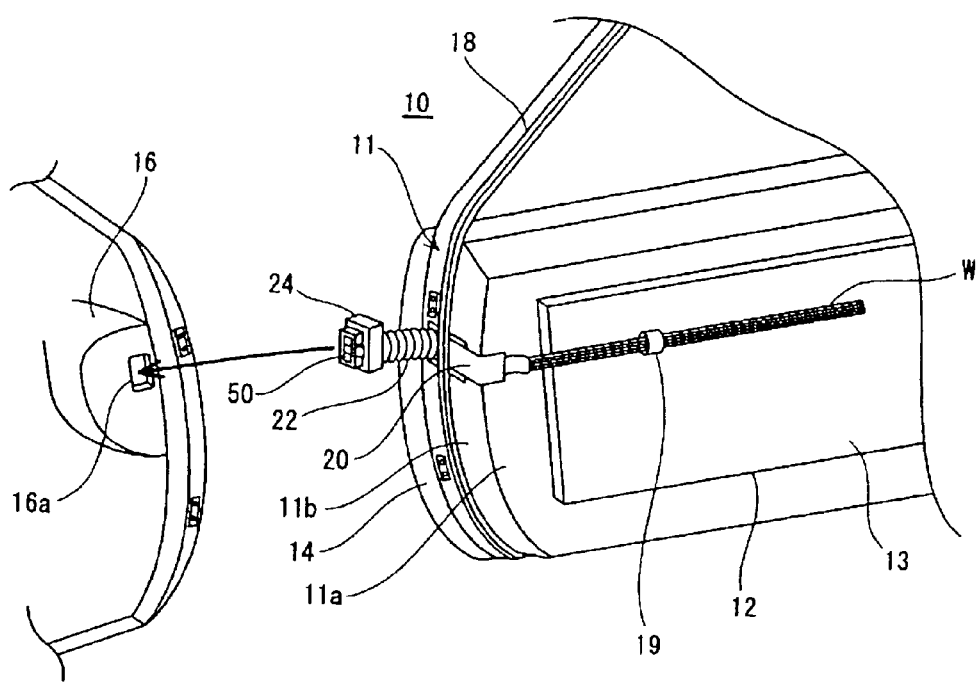
FIG. 3 is a perspective view of a structure for mounting a door harness according to a first embodiment of the present invention.

The inward-face side section of the recessed portion 30 (see FIGS. 4A and 4B) is provided with a clip-fixing hole 32 which is configured to engage a stopper clip 29 of the grommet 20 (see FIG. 5A), when the latter is bent. Further, as shown in FIG. 3, the inward face 11a of the door inner panel includes a recessed area 12, such that the periphery of that recessed area 12 forms an outer frame. A detachable panel 13 fits into the recessed area 12. The detachable panel 13 may be formed of any suitable material such as, for example, resin. The outward face of the door inner panel 11 is provided with an outer panel 14. The outer panel 14 may be formed of any suitable material such as, for example, metal.

As shown in FIG. 4B, a linking frame 40 is fixed to the shouldered section 31 in a suitable manner such as, for example, by spot welding. The linking frame 40 may be made of any suitable material such as, for example, metal, and has a substantially U-shape, with two arm portions 40b. As shown in FIG. 4A, the edges of the two arm portions 40b project beyond a corner section 30b of the recessed portion 30, so as to define projecting guides 41. The thickness of the linking frame 40 is substantially the same as the depth of the shouldered section 31. Accordingly, when the linking frame 40 is fitted into the shouldered section 31, the edge face 11b of door inner panel 11 and the arm portions 40b of the linking frame 40 form a uniform surface.

Figure 5A:
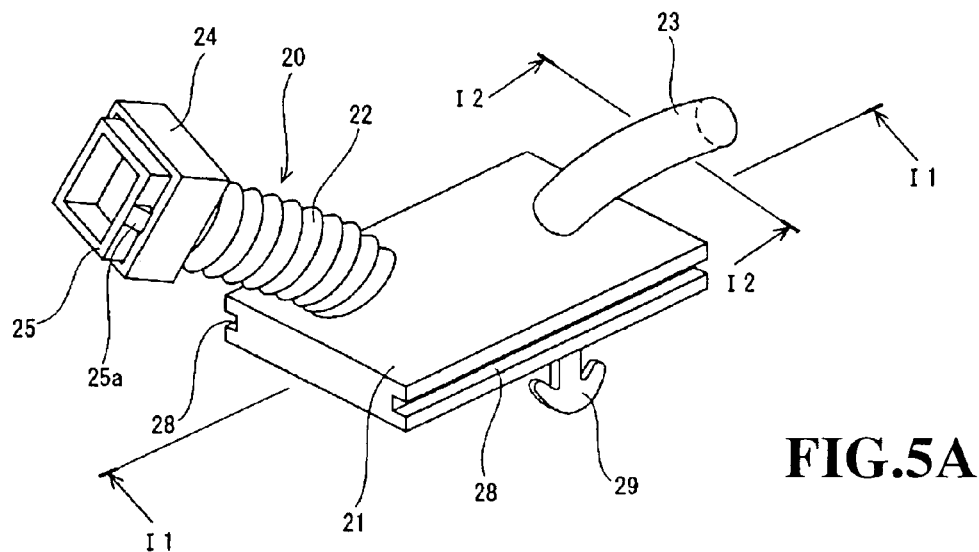
FIG. 5A is a perspective view of the grommet/duct of the present invention.
Figure 5B:
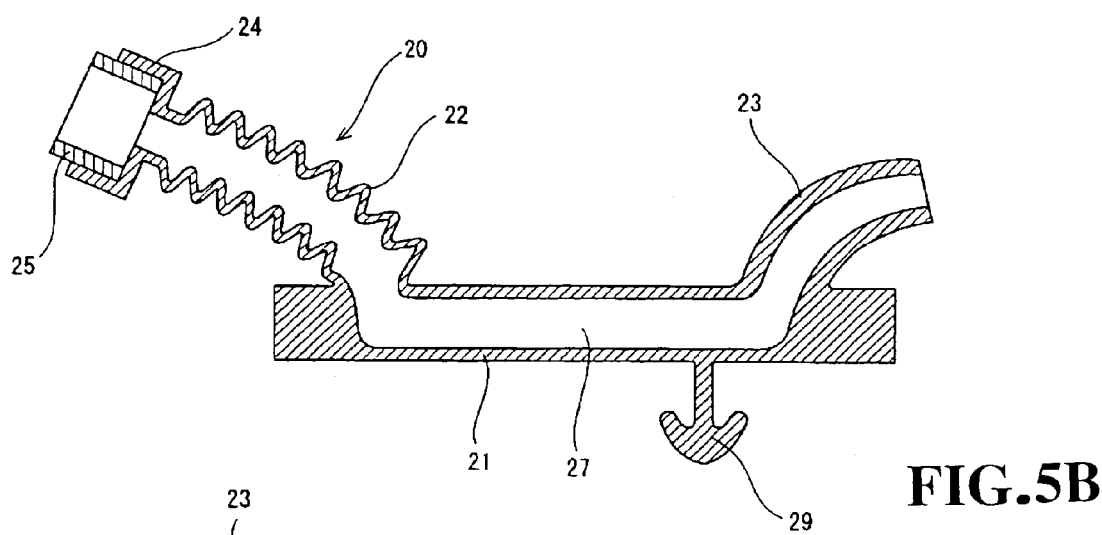
FIG. 5B is a cross-sectional view of the grommet taken along line I1—I1 of FIG. 5A.

As shown in FIGS. 5A and 5B, the grommet 20 fits into the recessed portion 30. The grommet 20 may be made of any suitable material such as, for example, rubber. The grommet 20 includes a substantially flat portion 21 having a rectangular shape, through which the door harnesses W is passed. The grommet 20 further includes first and second tubular portions 22 and 23 which project from the longitudinal end portions of the substantially flat portion 21. The first tubular portion 22 has a bellows section and projects toward the body panel 16 when mounted. Its end portion is provided with a connector housing 24. The connector housing 24 contains an inner frame 25, made of a suitable material such as, for example, resin, and is equipped with stopper claws 25a, such that both the inner frame 25 and the stopper claws 25a project outwardly beyond the connector housing 24.

Figure 5C:
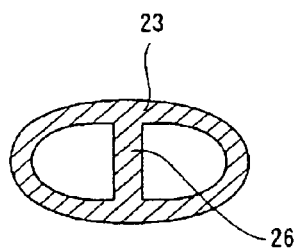
FIG. 5C is a cross-sectional view of the tubular portion of the grommet/duct taken along line I2—I2 of FIG. 5A.
Figure 6A:
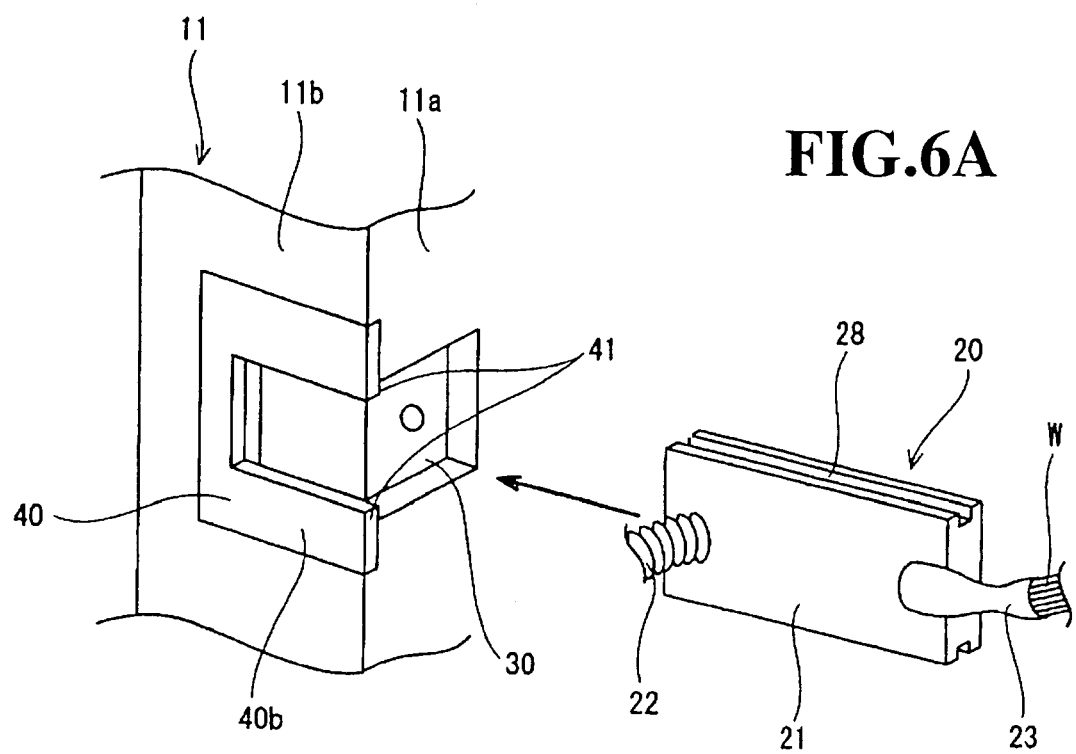
FIG. 6A is a perspective view of the corner portion of the door inner panel and the grommet/duct, before the latter is fitted thereto in the embodiment of FIG. 3.
Figure 6B:
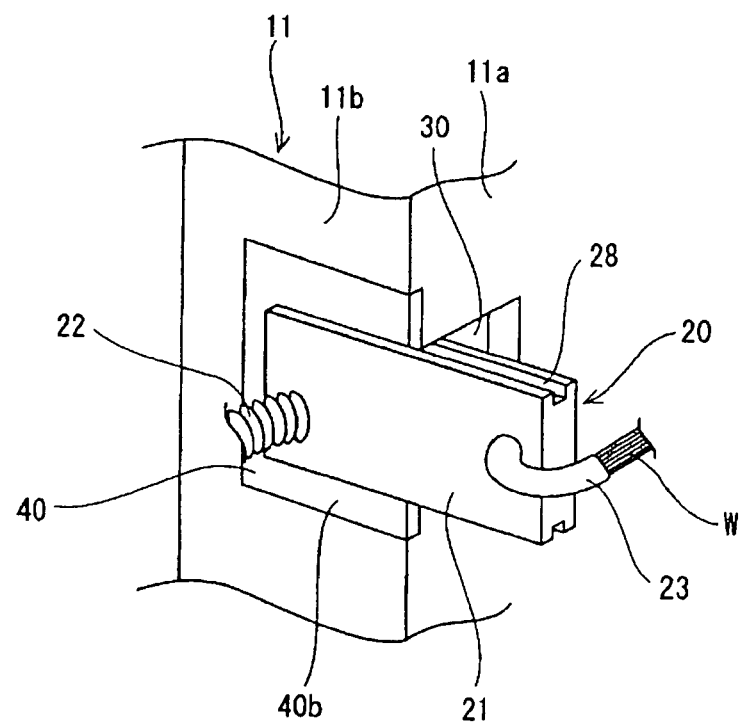
FIG. 6B is a perspective view of the corner portion of the door inner panel and the grommet, after the latter is fitted thereto in the embodiment of FIG. 3.

The second tubular portion 23 has a substantially oval-shaped cross-section, as shown in FIG. 5C, and projects along the inward face 11a of the door inner panel 11 when mounted (see FIG. 6B). A dividing wall 26 bridges opposite points of the second tubular portion 23 where the oval cross-section is narrowest, as shown in FIG. 5C. The substantially flat portion 21 contains at least one bore portion, which may have the form of an elongate cavity 27 (FIG. 5B), for example, and which connects the tubular hole of the first tubular portion 22 to that of the second tubular portion 23. The door harness W is passed through these thus-defined void passages to be mounted into the grommet 20. Further, the longitudinal side edges of the flat portion 21 are respectively provided with grooved guides 28. The bottom face of the flat portion 21 (as depicted in FIG. 5A and 5B) is provided with the stopper clip 29 at a position substantially opposite to the connection point of the second tubular portion 23. This stopper clip 29 engages the grommet 20 with the door inner panel 11 through the clip-fixing hole 32 (FIGS. 4A, 4B). The flat portion 21 may have a shape generally similar to a substantially flat rectangular volumetric prism, for example, and is also referred to herein as a "housing."

The door harness W in accordance with the present invention is mounted in the following manner. The door harness W is passed through the grommet 20, and a connector 50 is fixed to the end of the door harness W. The connector 50 is fitted into the inner frame 25 contained in the connector housing 24, so that the grommet 20 is mounted around the door harness W. The door harness W extending from the grommet 20 is then fixed to the detachable panel 13 by a clamp 19 (see FIG. 3). The detachable panel 13 may be formed of any suitable material such as, for example, resin.

As shown in FIGS. 6A and 6B, the ribbed guides 41 (see also FIG. 4B) in the linking frame 40, affixed to the edge face 11b of the door inner panel 11, receive the grooved guides 28. The grommet 20 is slid along those guides until the leading edge of the flat portion 21, where the first tubular portion 22 is provided, abuts against the internal face of the linking frame 40.

Figure 7:
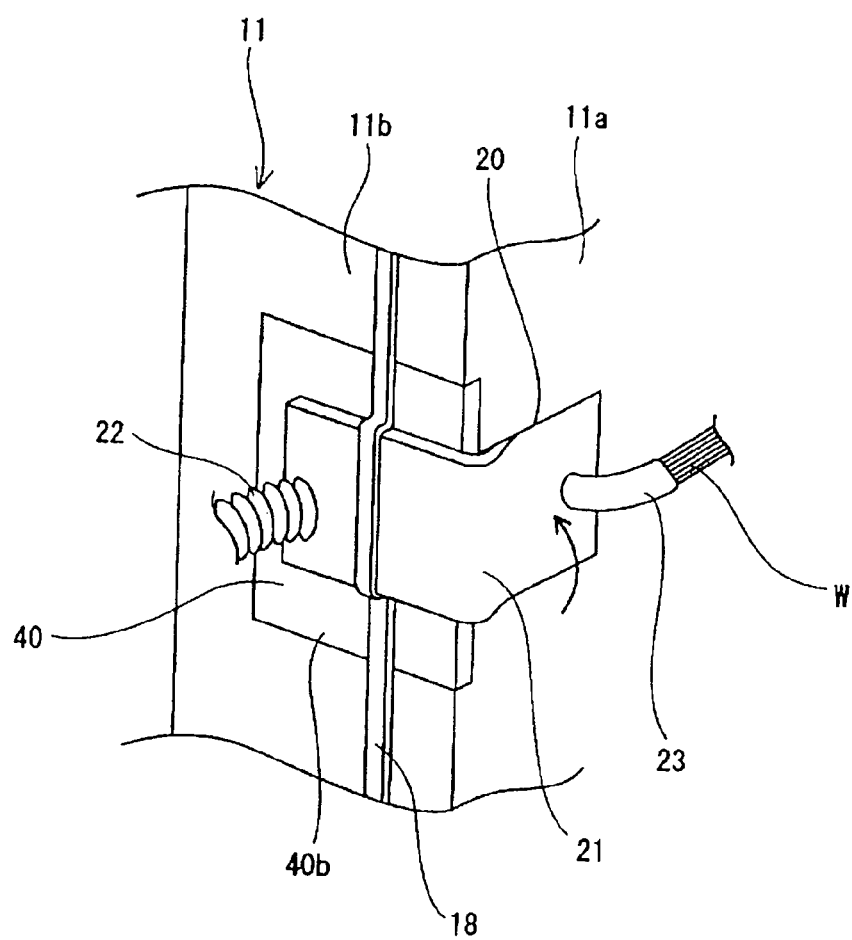
FIG. 7 is a perspective view of the corner portion of the door inner panel, when the grommet is fixed into a recessed portion in the inward face of the door inner panel and a weather strip is mounted in the embodiment of FIG. 3.

Then, as shown in FIG. 7, the tail part of the flat portion 21 is bent toward the inward face 11a of the door inner panel 11, and fitted into the inward-face side section of the recessed portion 30. Thereafter, the stopper clip 29 of the grommet 20 is engaged in the clip-fixing hole 32, so that the grommet 20 engages the door inner panel 11.

The detachable panel 13 is fitted into the recessed area 12 of the door inner panel 11 (FIG. 3). A trim (not shown in the Figs.) is then installed from over the inward face 11a of the door inner panel 11, and the grommet 20 fitted in the recessed portion 30. In this condition, the grommet 20 is firmly fixed in the recessed portion 30 under the trim. Further, the weather strip 18 extends along the (vertical) longitudinal direction of the edge face 11b of the door inner panel 11. It may be located closer to the vehicle's compartment than the first tubular portion 22 of the grommet 20.

Figure 8:
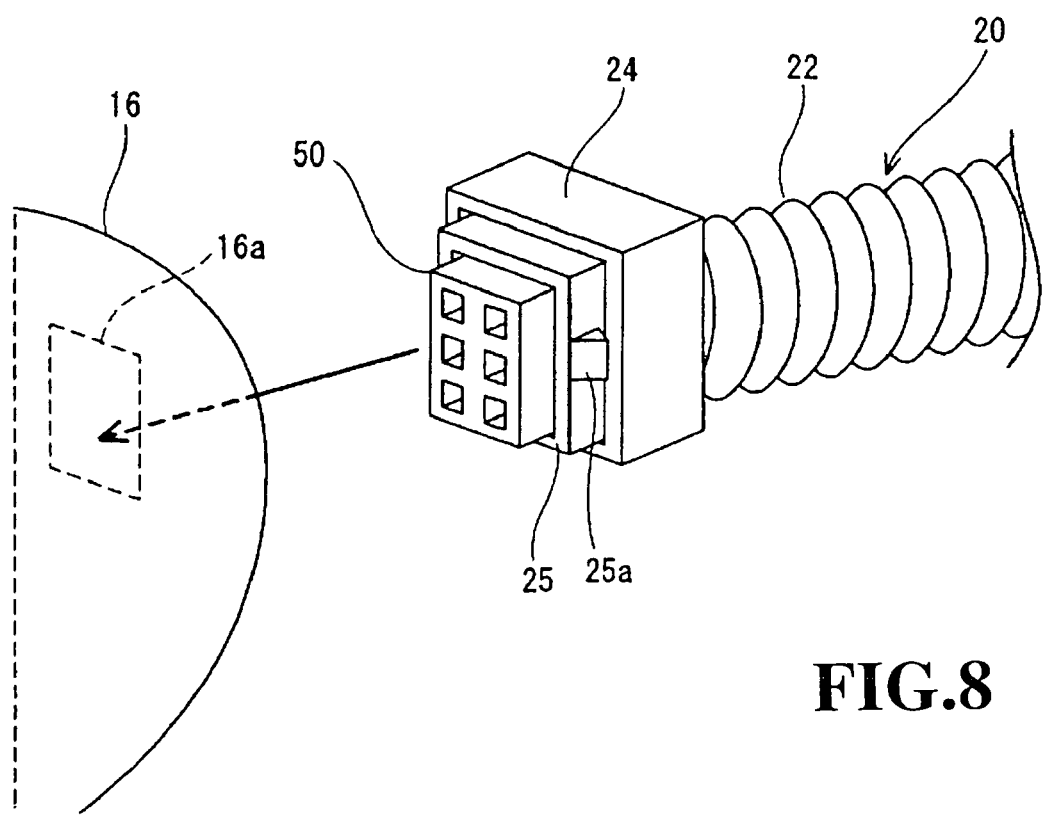
FIG. 8 is a perspective view of a connector housing attached to the grommet/duct that is to be connected to the body panel in the embodiment of FIG. 3.

As shown in FIG. 8, the first tubular portion 22 of the grommet 20 is mounted on the door inner panel 11 and pulled toward the body panel 16. The inner frame 25 mounted on the grommet 20 is then inserted into the hole 16a of the body panel 16, and is engaged therein by the stopper claws 25a. The connector 50 at the free end of the first tubular portion 22 is thus connected to the corresponding section of wire harness (not shown in the FIGS.) in the body panel 16.

In the above structure 10, the linking frame 40 is fixed in the recessed portion 30 in the door inner panel 11. Since the grommet 20 is already affixed to the linking frame 40 at a predetermined position, the door harness W can be easily wired from the door inner panel 11 to the body panel 16, by merely fixing the grommet 20 to the door inner panel 11.

Further, the door harness W is drawn out from the door inner panel 11 toward the body panel 16 in the area outside the weather strip 18, relative to the vehicle's compartment. Nonetheless, water sealing is not compromised, because the grommet 20 is very closely attached to the linking frame 40.

In the above structure, the harness-receiving recessed portion 30 (FIGS. 6A and 6B) is provided in a simple manner at the position of door inner panel 11 where the grommet 20 is to be mounted, and the linking frame 40 is fixed thereto. Accordingly, it is not necessary to stamp out a complicated shape in the door inner panel 11. As a result, the assembling steps are simplified and manufacturing costs of the structure are lowered.

Figure 9:
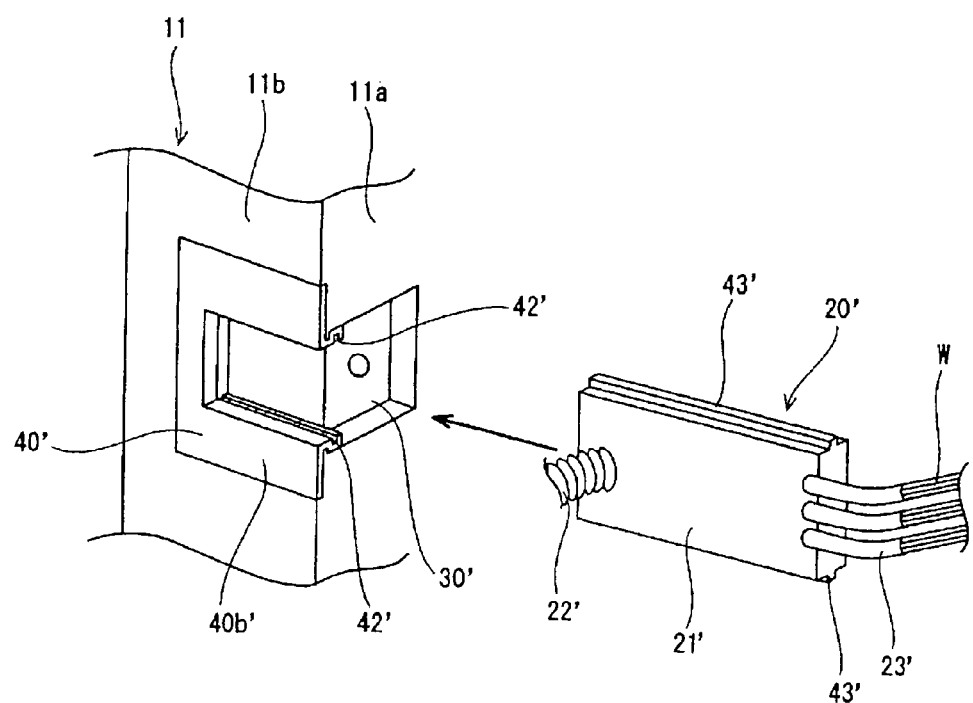
FIG. 9 is a perspective view of the corner portion of the door inner panel and the grommet/duct, according to a variant of the first embodiment of the present invention.

FIG. 9 shows a variant of the first embodiment of the present invention, in which only the constructions of the linking frame and grommet differ from those of the first embodiment. A linking frame 40' has a U-shape with two arm portions 40b', and the opposing inward edges of the two arm portions 40b' are bent to form grooved guides 42'. The linking frame 40' may be made of any suitable material such as, for example, metal sheet. Correspondingly, the grommet 20' includes ribbed guides 43' along each of the longitudinal sidewalls of the flat portion 21', and the ribbed guides 43' fit into the grooved guides 42'. Further, there is provided a plurality of tubular portions 23' projecting from the first face of the flat portion 21'. There may be any suitable number of tubular portions 23' and in the present embodiment, three tubular portions 23' are provided.

In the above configuration, the linking frame 40' is affixed in the recessed portion 30' installed in the door inner panel 11. Since the ribbed guides 43' of the grommet 20' are fitted into the grooved guides 42' of the linking frame 40 and positioned and fixed therein, the door harness W can be easily wired from the door inner panel 11 to the body panel 16, by a simple action of inserting the grommet 20' into the door inner panel 11.

Moreover, as there are provided a plurality of tubular portions 23' projecting from the grommet 20', the door harness W can easily be made substantially flat, and thus more amenable to being wired in a small space, such as one formed between the detachable panel and the trim.

The number of tubular portions 23' of the grommet 20' is not limited to three, but may be two or four or more.

The other configurations and effects of the operations are as in the first embodiment described with reference to FIGS. 3 to 8. They are therefore referred to with the same reference numbers, and explanations are omitted for conciseness.

FIGS. 10 to 13 show a structure 10 for wiring a door harness W according to a second embodiment of the present invention. As in the first embodiment, the door inner panel 11 includes an inward face 11a confronting the vehicle's compartment, and an edge face 11b confronting a corresponding edge face of the body panel 16 when the door is closed. A weather strip 18 extends along a longitudinal (vertical) direction of the edge face 11b, and a door harness W is wired to the body panel 16 from outside the weather strip, relative to the inward face of the door inner panel 11.

Figure 10:
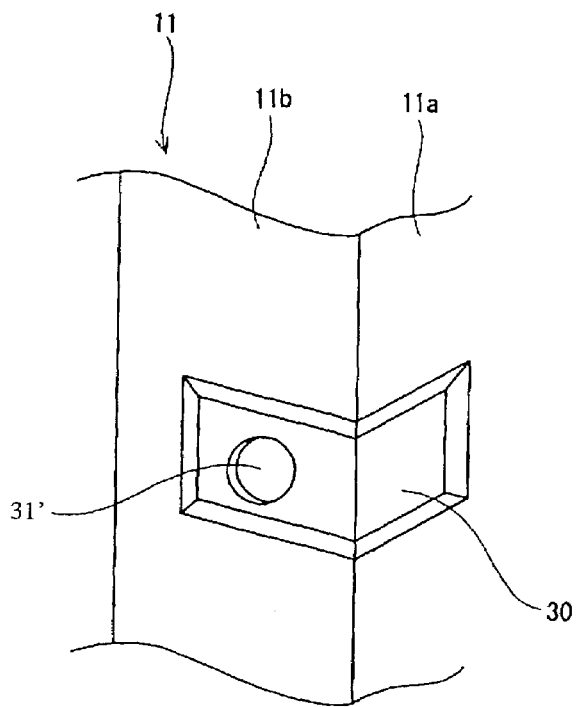
FIG. 10 is a perspective view of a structure for mounting a door harness according to a second embodiment of the present invention.

As shown in FIG. 10, the door inner panel 11 is provided with a recessed portion 30, in the corner formed between the inward face 11a and the edge face 11b. Further, a hole 31 for fitting the grommet is provided through the base of the recessed portion 30, at the edge-face side section of the recessed portion 30. The hole 31 may have any suitable shape, and in the present embodiment, has a substantially round shape.

Further, as in the first embodiment and shown in FIG. 3, the inward face 11a includes a recessed area 12, so that part of the inward face 11a forms an outer frame, and the detachable panel 13 fits into the recessed area 12. The outward face of the door inner panel 11 is provided with an outer panel 14.

Figure 11A:
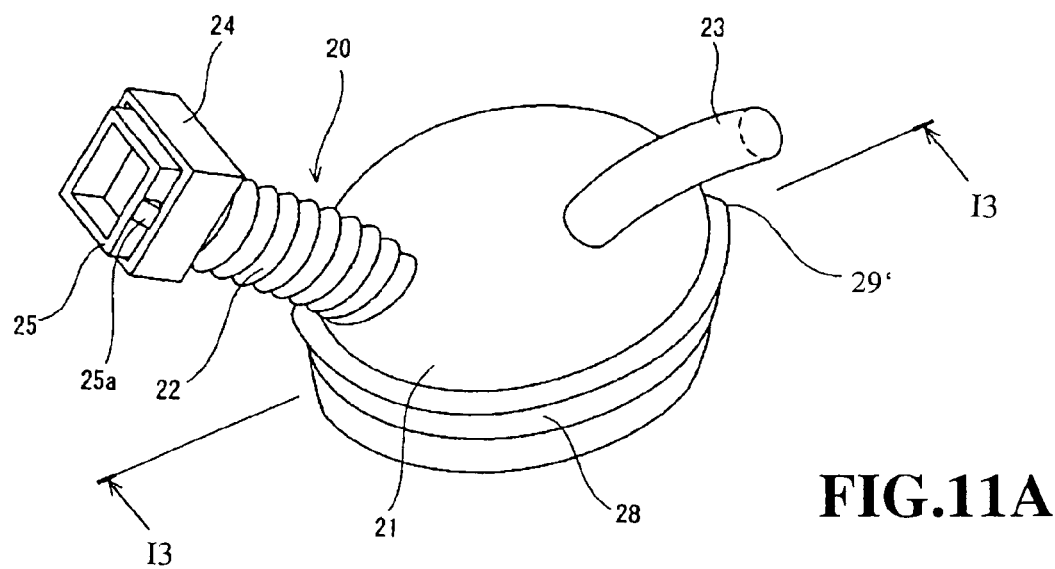
FIG. 11A is a perspective view of a grommet to be mounted to the structure of FIG. 10.
Figure 11B:
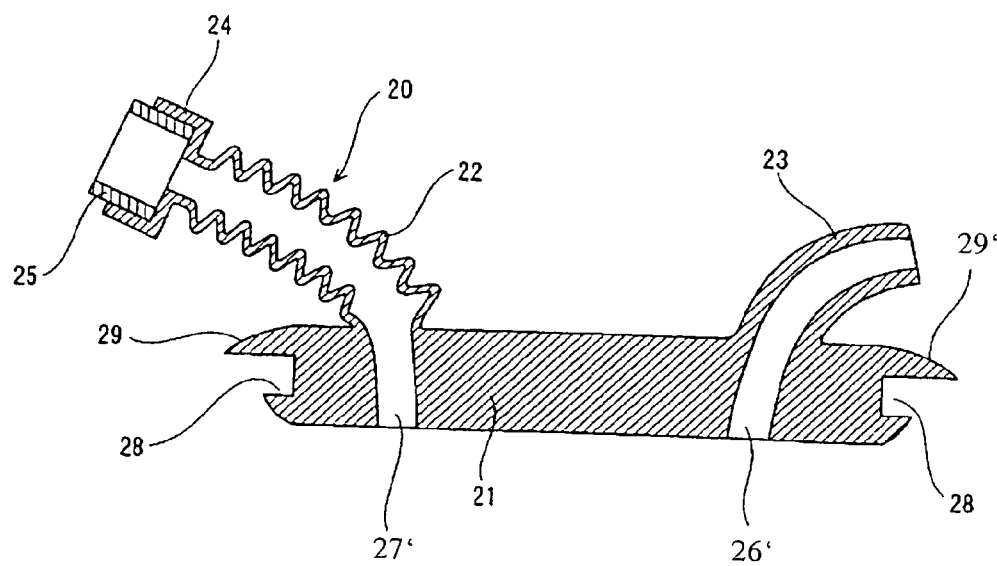
FIG. 11B is a cross-sectional view of the grommet taken along line I3—I3 of FIG. 11A.

As shown in FIGS. 11A and 11B, the grommet 20 to be fitted into the hole 31, includes a substantially disk-like portion 21 having opposite first and second faces, and a first tubular portion 22 and a second tubular portion 23 that project from respective positions distal to each other on the first face of the disk-like portion 21. The grommet may be formed of any suitable material such as, for example, rubber or an elastomer.

The first tubular portion 22 has a bellows section and, when installed, projects toward the body panel 16. One end of the first tubular portion 22 includes a connector housing 24, from which extends outwardly an inner frame 25 including stopper claws 25a.

The second tubular portion 23 has a cross-section defining a circular ring and, when installed, allows the door harness W to extend along the inward face 11a of the door inner panel 11. The disk-like portion 21 includes two holes 26' and 27' which extend from the corresponding first and second tubular portions 22 and 23 and attain the second face of the disk-like portion 21 (see FIG. 11B). The side face of the disk portion 21 includes a grooved guide 28 that engages the hole 31. The grooved guide 28 thus forms two ribs, including the rib adjacent the first face of the disk-like portion 21. The external end of the latter rib is tapered outwardly in the diametrical direction (FIG. 11B), thereby forming a seal lip 29' adapted to fit to the periphery of the hole 31.

The procedure for mounting the door harness W with this second embodiment is as follows. The door harness W is introduced into the second tubular portion 23 and the tubular hole 26', pulled out from the second face of the disk portion 21, then turned, and inserted into the tubular hole 27' and the first tubular portion 22.

The connector 50 is connected to the door harness W. The connector 50 is then fitted into the inner frame 25, contained in the connector housing 24 of the grommet 20. As shown in FIG. 3, the door harness W extending from the grommet 20 is fixed to the detachable panel 13 by clamp 19. When the detachable panel 13 is integrally provided with a holding portion, the door harness W is fixedly held by this holding portion.

Figure 13:
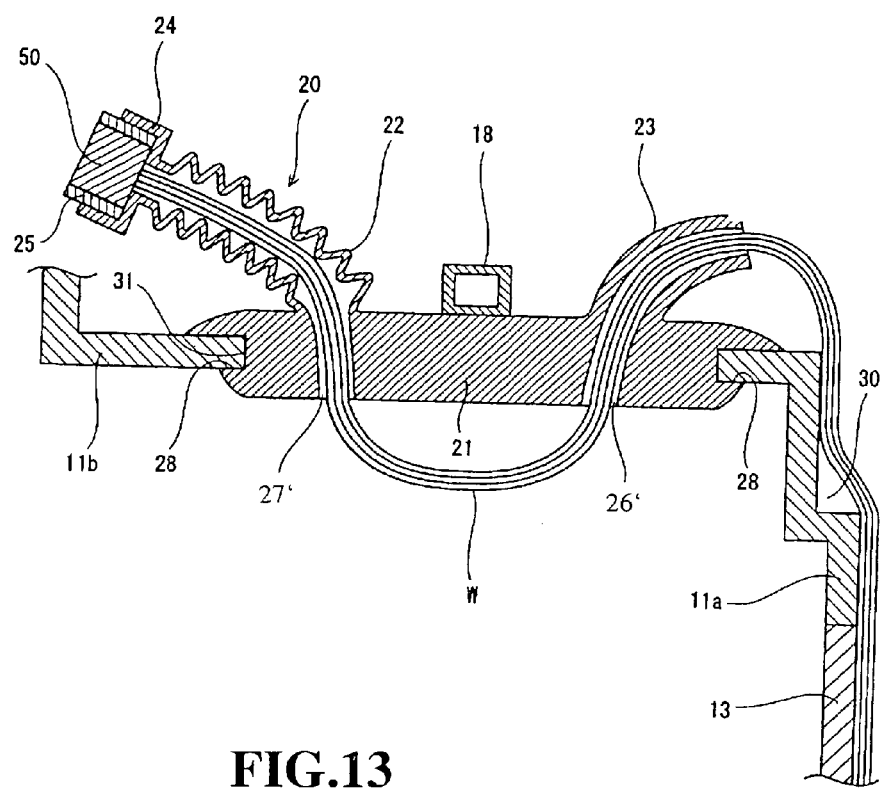
FIG. 13 is a cross-sectional view of the grommet taken along line I4—I4 of FIG. 12.

As shown in FIG. 13, the detachable panel 13 is fixed into the recessed area 12 of the door inner panel 11.

Figure 12:
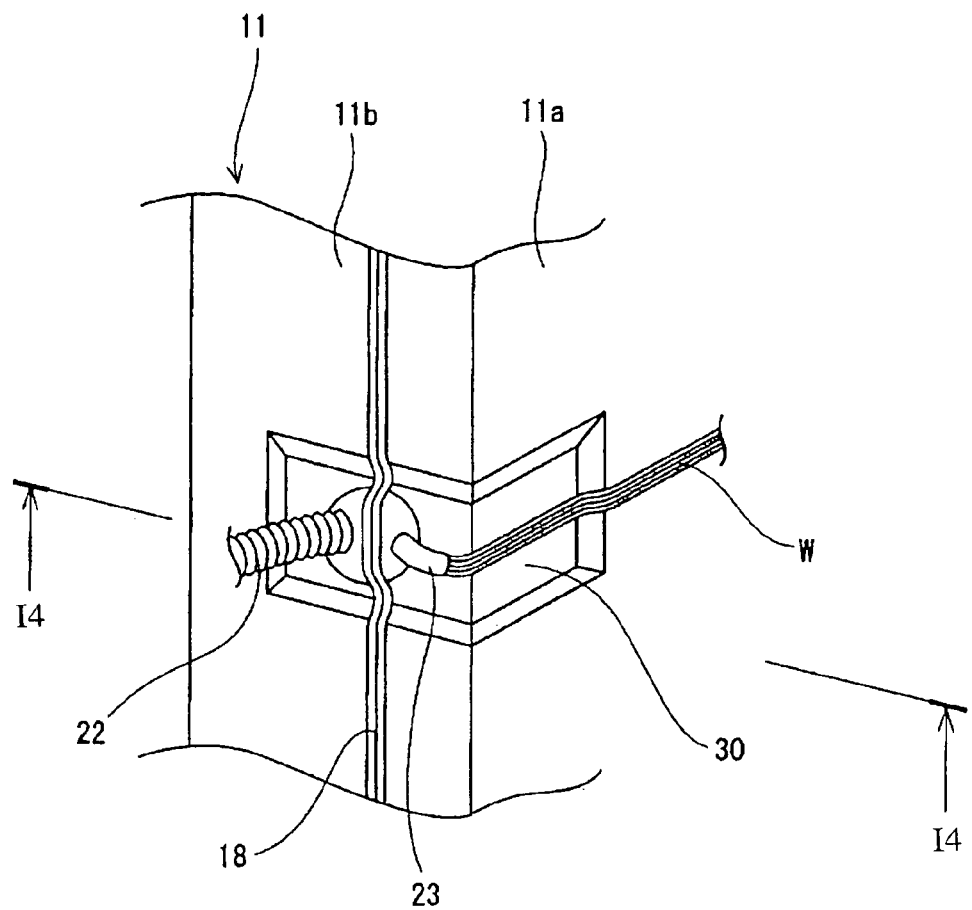
FIG. 12 is a perspective view of the corner portion of the door inner panel, when the grommet and the weather strip are mounted in the embodiment of FIG. 10.

As shown in FIG. 12, the door harness W is wired over the inward face 11a of the door inner panel 11 and passed into the inward-face section of the recessed portion 30. Then, the grooved guide 28 of the grommet 20 is engaged with the periphery of the hole 31 provided in the edge-face section of the recessed portion 30 of the door inner panel 11, whereby the grommet 20 engages with the door inner panel 11. In this state, the first tubular portion 22 is disposed farther from the vehicle compartment, relative to the second tubular portion 23.

The trim (not shown) is then covered onto the detachable panel 13, and the weather strip 18 is mounted on the edge face 11b of the door inner panel 11, such that it runs along the edge face 11b and passes between the first and the second tubular portions 22 and 23.

As for the first embodiment shown in FIG. 8, the first tubular portion 22 of grommet 20 mounted on the door inner panel 11 is pulled out toward the body panel 16, and the stopper claws 25a of the inner frame 25 are inserted into the hole 16a of the body panel 16 and engaged therein. In this manner, the connector 50 at the edge of the door harness W is connected to a wire harness (not shown) in the body panel 16.

According to the structure 10 of the second embodiment, the grommet 20 can be easily fixed to the door inner panel 11, by merely fitting the grommet 20 into the hole 31 in the door inner panel 11, whereby the door harness W is wired from the door inner panel 11 to the body panel 16. Further, as the grommet 20 may an integrally molded product, the number of component parts and assembly steps can be reduced. Consequently, the manufacturing costs of the total structure are also reduced.

As can be understood, the door harness W exiting toward the body panel 16 is placed farther from the inward face 11a than the weather strip 18. However, water sealing is nonetheless assured by the tight engagement of the seal lip 29' of the grommet 20 with the periphery of the hole 31.

More generally, the grommet 20 may have any suitable shape such as, for example, oval or elliptical.

Further, the holes in the substantially disk-like portion may be a void passage connecting the bore portion in the first tubular portion and that of the second tubular portion.

Then, the door harness W is not drawn out from the second face of the disk portion, but passed through this void passage in the disk-like portion.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

The present disclosure relates to subject matter contained in priority Japanese Application Nos. 2004-006876 and 2004-007097, both filed on Jan. 14, 2004, which are both herein expressly incorporated by reference in their entireties.

What is claimed is:

1. A device for mounting a door harness from a door inner panel toward a body panel in a vehicle, the door harness being mountable into a grommet, said door harness comprising:
   a portion of the door inner panel proximal to the body panel;
   a recessed portion in the proximal portion of the door inner panel;
   a grommet holding device in said recessed portion;
   wherein the grommet may be fixed into said recessed portion from outside the door inner panel,
   wherein the door inner panel includes an inward face confronting a compartment of the vehicle,
   wherein the grommet holding device includes a shouldered section formed in a periphery of the recessed portion, the shouldered section being fitted with a separate linking frame including ribbed or grooved guides,
   wherein the grommet includes a housing having a substantially flat rectangular shape including a first face, a second face, longitudinal side faces provided with respective grooved or ribbed guides, a first tubular portion disposed proximal to the body panel and projecting from the first face of the housing and a second tubular portion distal from the panel body, and
   wherein the grommet is fitted to the recessed portion in a folded condition, such that the grooved or ribbed guides of the grommet slidingly fit with the ribbed or grooved guides of the linking frame and the second tubular portion projects alone the inward face.

2. The device according to claim 1, wherein said door inner panel includes an edge face configured to confront a corresponding edge face of a vehicle body panel when the door is closed, and said portion proximal to said body panel includes a weather strip, said grommet being positioned farther outward than said weather strip along the edge face of the door inner panel.

3. The device according to claim 1, wherein said door inner panel has an edge face confronting a body panel, and a corner zone formed between said inward face and said edge face;
   wherein said recessed portion is formed in said corner zone and includes a first portion at said edge face with a periphery and a second portion at said inward face, and said grommet holding device is provided in said first portion at said edge face;
   the housing of said grommet including a side face and at least one bore portion, said second tubular portion projecting from said first face of said housing and communicating through said at least one bore portion;
   wherein said grommet is fixed to said door inner panel by said grommet holding device.

4. The device according to claim 1, wherein said linking frame has a substantially U-shaped configuration with two arm portions, said arm portions extending from said shouldered section of said recessed portion beyond said inward face forming a projecting guide and, said ribbed guides of said arm portions interfit with grooved guides of said grommet.

5. The device according to claim 3, wherein said first tubular portion includes a bellows section and an end portion with a stopper, which engages a hole in said body panel;
   wherein said at least one second tubular portion includes at least one dividing wall so as to form a plurality of longitudinal compartments, wherein the electrical cables in said door harness can be divided into said longitudinal compartment.

6. The device according to claim 3, wherein said at least one second tubular portion includes a plurality of second tubular portions, wherein the electrical cables in said door harness can be divided into said longitudinal compartment.

7. The device according to claim 3, wherein said grommet includes a clip and said second portion at said inward face of said recessed portion includes a clip hole for hooking said clip.

8. The device according to claim 1, wherein said linking frame is made of a metal.

9. The device according to claim 1, wherein said grommet is made of rubber or an elastomer.

10. A door harness wiring system including a device for mounting a door harness from a door inner panel toward a body panel in a vehicle, said door inner panel having a portion proximal to said body panel, said door harness being mountable into a grommet, said proximal portion being recessed at a recessed portion of the proximal portion and said recessed portion including a grommet holding device,
    wherein said grommet can be fixed into said recessed portion from outside said door inner panel,
    wherein the door inner panel includes an inward face confronting a compartment of the vehicle,
    wherein the grommet holding device includes a shouldered section formed in a periphery of the recessed portion, the shouldered section being fitted with a separate linking frame including ribbed or grooved guides,
    wherein the grommet includes a housing having a substantially flat rectangular shape including a first face, a second face, longitudinal side faces provided with respective grooved or ribbed guides, and a first tubular portion disposed proximal to the body panel and projecting from the first face of the housing and a second tubular portion distal from the panel body, and
    wherein the grommet is fitted to the recessed portion in a folded condition, such that the grooved or ribbed guides of the grommet slidingly fit with the ribbed or grooved guides of the linking frame and the second tubular portion projects along the inward face.

11. A method for mounting a door harness from a door inner panel toward a body panel in a vehicle, said method comprising:

providing a recessed portion in a portion of said door inner panel proximal to said body panel, the door inner panel including an inward face confronting a compartment of the vehicle;

providing a grommet holding device in said recessed portion;

providing a grommet into which said door harness is mountable, the grommet including a housing having a substantially flat rectangular shape including a first face, a second face, longitudinal side faces provided with respective grooved or ribbed guides, and a first tubular portion disposed proximal to the body panel and projecting from the first face of the housing and a second tubular portion distal from the panel body;

affixing said grommet in said recessed portion from outside said door inner panel;

forming a shouldered section of the grommet holding device in a periphery of the recessed portion;

providing the shouldered section with a separate linking frame including ribbed or grooved guides; and fitting the grommet to the recessed portion in a folded condition, such that the grooved or ribbed guides of the grommet is slidingly fit with the ribbed or grooved guides of the linking frame and the second tubular portion projects along the inward face.

* * * * *